US012720401B2

(12) United States Patent
Zerzghi

(10) Patent No.: US 12,720,401 B2
(45) Date of Patent: Aug. 25, 2026

(54) WIRELESS ACCESS POINT ROUTE SELECTION POLICY DISTRIBUTION FOR END-TO-END NETWORK SLICING

(71) Applicant: Verizon Patent and Licensing Inc., Basking Ridge, NJ (US)

(72) Inventor: Alexander Zerzghi, Branchbug, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 330 days.

(21) Appl. No.: 18/391,333

(22) Filed: Dec. 20, 2023

(65) Prior Publication Data

US 2025/0212086 A1 Jun. 26, 2025

(51) Int. Cl.
*H04W 4/00* (2018.01)
*H04W 40/02* (2009.01)

(52) U.S. Cl.
CPC .................................. *H04W 40/02* (2013.01)

(58) Field of Classification Search
CPC .................................................... H04W 40/02
See application file for complete search history.

(56) References Cited

U.S. PATENT DOCUMENTS

2022/0369198 A1* 11/2022 Jagannatha ........... H04W 40/02
2023/0100822 A1* 3/2023 Huang-Fu ............ H04W 76/11 370/310
2023/0112434 A1* 4/2023 Huang-Fu ............ H04W 40/02 370/329
2023/0189115 A1* 6/2023 Shekhar ................ H04W 48/18 370/329
2024/0121836 A1* 4/2024 Cheng ..................... H04W 8/20
2024/0259260 A1* 8/2024 Mindel ............... H04L 41/0894
2024/0381472 A1* 11/2024 Abdelmalek ......... H04W 40/02
2024/0388989 A1* 11/2024 Sahin .................... H04W 40/02
2025/0016602 A1* 1/2025 Foti ....................... H04W 48/06
2025/0097812 A1* 3/2025 Patil ...................... H04L 45/306

FOREIGN PATENT DOCUMENTS

WO WO-2024065758 A1 * 4/2024 ............ H04W 76/12

* cited by examiner

*Primary Examiner* — Elisabeth Benoit Magloire

(57) ABSTRACT

A Fixed Wireless Access (FWA) gateway (GW), wirelessly connected to a mobile network, receives user equipment device (UE) Route Selection Policy (URSP) information that includes UE policy rules. The FWA GW determines UEs that are connected to the FWA GW and determines policy rules for each of the connected UEs based on the received URSP UE policy rules. The FWA GW distributes the determined policy rules to each of the connected UEs for policy application at each of the connected UEs.

20 Claims, 9 Drawing Sheets

WIRELESS ACCESS POINT ROUTE SELECTION POLICY DISTRIBUTION FOR END-TO-END NETWORK SLICING

BACKGROUND

"Network Slicing" is an innovation for implementation in Next Generation Mobile Networks, such as, for example, Fifth Generation (5G) Mobile Networks. Network slicing is a type of virtualized networking architecture that involves partitioning of a single physical network into multiple virtual networks that may be composed of various Virtual Network Functions (VNFs). The partitions, or "slices," of a virtualized network, including each slice's VNFs, may be customized to meet the specific needs of applications, services, devices, customers, or operators. Each network slice can have its own architecture, provisioning management, and security that supports data sessions transported over the network slice. Bandwidth, capacity, and connectivity functions are allocated within each network slice to meet the requirements of the objective of the particular network slice. For example, each network slice, when created in a mobile network, may be designed to satisfy one or more performance characteristics or performance requirements for data sessions that are serviced by the network slice. Network slicing may be implemented in a dynamic fashion, such that the slices of the virtualized network may change over time and may be re-customized to meet new or changing needs of applications, services, devices, customers, or operators.

DETAILED DESCRIPTION

Figure 1:
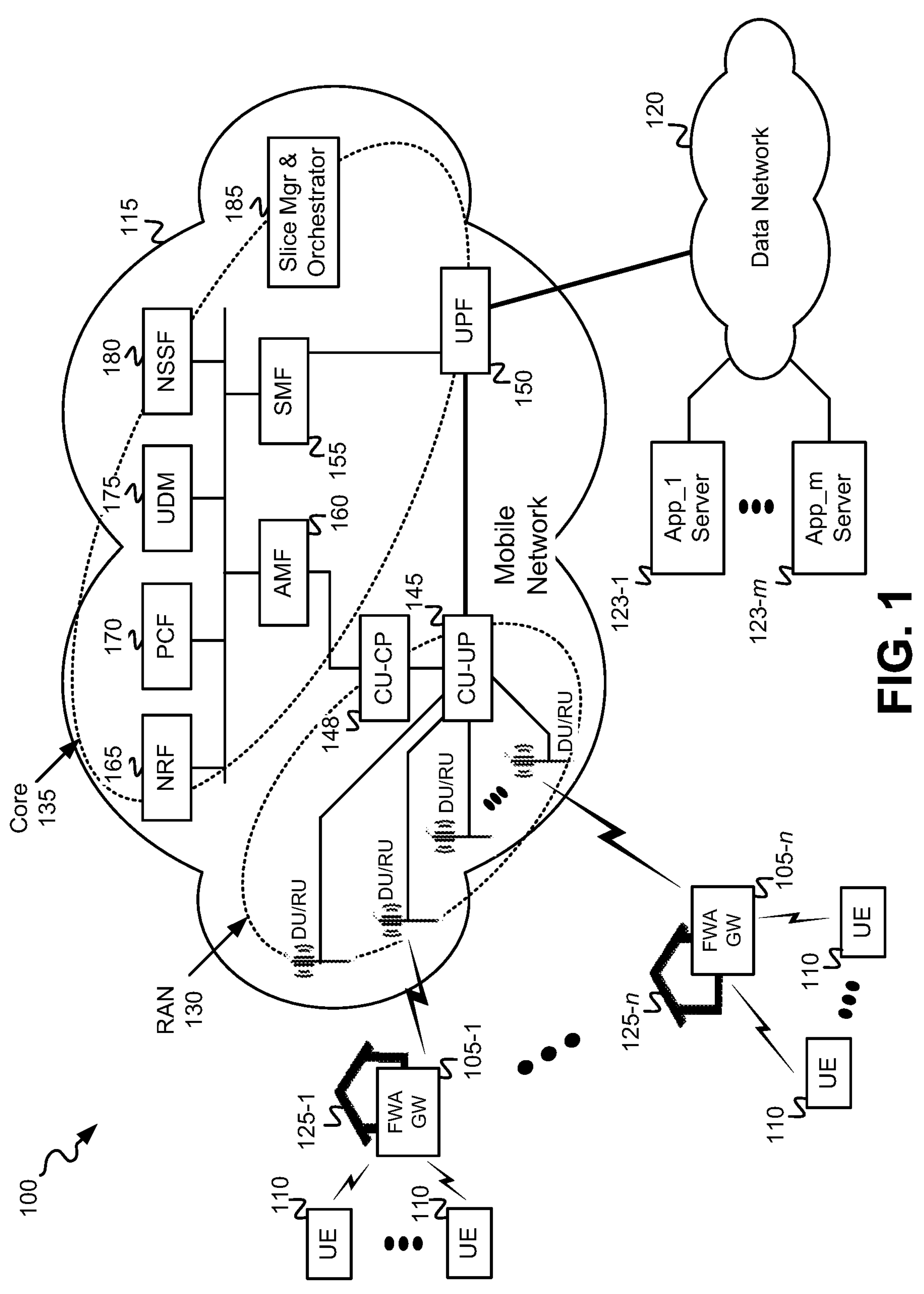
FIG. 1 illustrates an exemplary network environment in which policy rules are distributed from a Fixed Wireless Access gateway (FWA GW) to User Equipment devices (UEs) connected behind the FWA GW such that end-to-end network slicing may be implemented.

The following detailed description refers to the accompanying drawings. The same reference numbers in different drawings may identify the same or similar elements. The following detailed description does not limit the invention.

Fixed Wireless Access (FWA) is a type of network service that may be implemented by mobile networks (e.g., 5G New Radio (NR) mobile networks) to enable network operators to deliver ultra-high-speed wireless broadband to suburban and rural areas without laying optical fiber or cables to provide "last mile" connectivity. The cost of providing fixed, wired broadband has challenged the roll-out of high-speed data services in many geographic areas. While different technologies, such as, for example, Worldwide Interoperability for Microwave Access (WiMAX), have attempted to alleviate the need to lay optical fiber trenches, these technologies have largely failed in the marketplace, primarily due to these technologies' requiring a completely new infrastructure and expensive proprietary equipment. FWA, in contrast, employs standardized mobile network architectures and common mobile network components to deliver ultra-high-speed wireless broadband services to residential and business subscribers. FWA implemented by Next Generation mobile networks, or by other types of mobile networks (e.g., Fourth Generation (4G) Long-Term evolution (LTE) networks), provides a competitive alternative to fixed-line Digital Subscriber Line (DSL), cable, and optical fiber, while also providing the bandwidth required to support high-definition streaming services and high-speed Internet access.

In a mobile network that implements FWA, residential or business locations may use a FWA gateway (e.g., a 5G Residential Gateway (RG)) to provide a connection between the user equipment devices (UEs) within a home or business and the mobile network. The FWA gateway (GW) operates as a gateway between the mobile network and a downstream Local Area Network (LAN) "behind" the FWA GW (e.g., a Wi-Fi LAN), to which the residential or business located UEs connect.

Network slicing is a key benefit of Next Generation wireless network architectures, such as the 5G mobile network architecture. Next Generation mobile networks are expected to support network slices that satisfy one or more performance characteristics for data sessions that are serviced by the network slices. Particular network slices may be built to support a class of applications (e.g., gaming, productivity apps, media streaming, messaging) requiring particular capabilities or performance characteristics, such as, for example, low latency and/or high uplink bandwidth. For UEs not connected to a mobile network through a FWA gateway, the UEs and their apps may steer traffic among multiple network slices implemented in the mobile network by using UE policy rules distributed to the UEs by the Policy Control Function (PCF) using UE Route Selection Policy (URSP) procedures. URSP procedures enable the mobile network to manage network slice information, and UE policy rules, for each UE. Upon receipt of URSP distributed UE policies rules from the PCF, each UE not connected to the mobile network through a FWA gateway may apply the UE policy rules to select a network slice(s) over which to route particular traffic.

Deploying FWA gateways at particular commercial/residential locations and connecting UEs to the mobile network via the FWA gateways creates difficulties with extending network slicing from the mobile network out through the FWA gateways to the UEs sitting behind the FWA gateways. Current URSP procedures terminate at the FWA gateways, such that the UEs connected to the FWA gateways cannot receive distributed UE policy rules and, thus, network slicing exists only between the FWA gateways and the mobile network and does not extend to the UEs behind the FWA gateways. Current Third Generation Partnership Project (3GPP) and Global System for Mobile Communications Association (GSMA) standards, therefore, lack implementation of procedures to propagate URSP policy rules to the UEs sitting behind the wireless Access Points (APs) (e.g., Wi-Fi APs) associated with FWA gateways. The current inability to extend network slicing to the UEs behind the FWA gateways may cause the UEs to experience traffic congestion such as, for example, when low latency UE applications (e.g., online mobile gaming, video streaming)

engage in sessions via the FWA gateways, thereby decreasing the Quality of Experience (QoE) of UE users.

Example embodiments described herein implement functionality in the FWA GWs to enable extension of network slicing to the UEs behind the FWA gateways such that true end-to-end network slicing exists. A FWA GW described herein receives URSP information sent from the Policy Control Function (PCF) in the mobile network, and determines device or application specific policy rules for each UE connected to the LAN behind the FWA GW based on the received URSP information. The FWA GW then distributes the determined device or application specific policy rules to each connected UE to enable the UEs behind the FWA GW to apply the policy rules for routing outgoing traffic via particular policy rule-directed network slices in the mobile network. The FWA GW further receives policy rule updates, via, for example, Manage UE Policy messages from the PCF, and determines and distributes updated device or application specific policy rules to each connected UE behind the FWA GW. The UEs then apply the updated policy rules to route outgoing traffic via particular policy rule-directed network slices in the mobile network.

FIG. 1 illustrates an exemplary network environment 100 in which policy rules are distributed from a FWA gateway to UEs connected behind the FWA GW such that end-to-end network slicing may be implemented. As shown, network environment 100 may include multiple FWA GWs 105-1 through 105-*n* (referred to herein as a "FWA GW 105" or "FWA GWs 105"), multiple UEs 110, a mobile network 115, and a data network(s) 120.

Each FWA GW 105 includes a network device that serves as a gateway between mobile network 115 and UEs 110 connected on a Local Area Network side (LAN-side) of each FWA GW 105. Each FWA GW 105 acts as a wireless Access Point (AP) for UEs 110 residing "behind" FWA GW 105 and enables the UEs 110 to engage in traffic sessions with mobile network 115 via, for example, one or more network slices. The FWA GW 105 supports a wireless interface (e.g., Uu interface for 5G Residential Gateway (RG) devices) for sending/receiving Radio Frequency (RF) signals to/from a Radio Access Network (RAN) 130 of mobile network 115 on a Wide Area Network (WAN) side of the FWA GW 105. FWA GW 105 additionally supports a wireless and/or wired interface for the UEs 110 to communicate with FWA GW 105 on the LAN side of FWA GW 105. The wireless interface may support, for example, wireless LAN access (e.g., Wi-Fi access) and/or wireless personal area network (PAN) access (e.g., Bluetooth™ access) to UEs 110. The wired interface may support, for example, wired LAN access to UEs 110. FWA GW 105 enables UEs 110 to engage in traffic sessions (e.g., Protocol Data Unit (PDU) sessions) with mobile network 115 via RF signals sent to/received from RAN 130 of mobile network 115. As shown in FIG. 1, each FWA GW 105 may be located at a particular residence or business location 125. For example, FWA GW 105-1 is shown located at residence/business location 125-1 and FWA GW 105-*n* is shown located at residence/business location 125-*n*.

Each of the UEs 110 may include any type of device having a communication capability such as, for example, a wired and/or wireless communication capability, that enables the establishment of a connection with a respective FWA GW 105. UEs 110 may include, for example, a laptop, palmtop, wearable, or tablet computer; a cellular phone (e.g., a "smart" phone); a Voice over Internet Protocol (VOIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user (not shown) may carry, use, administer, and/or operate each UE 110. Each UE 110 may communicate wirelessly with a FWA GW 105 via, for example, a wireless LAN (e.g., Wi-Fi) or a wireless PAN (e.g., Bluetooth). Alternatively, or additionally, each UE 110 may communicate via a wired connection with FWA GW 105 (e.g., via a wired LAN). Each UE 110 may include any type of networked device that connects to FWA GW 105, and to mobile network 115 via a connection between FWA GW 105 and the RAN 130 of mobile network 115.

Mobile network 115 (also referred to herein as "mobile network 115," "wireless network 115," or "network 115") may include a Public Land Mobile Network (PLMN) and possibly one or more other networks (not shown) that provides wireless (e.g., RF) communication with FWA GWs 105, and other UEs not shown in FIG. 1. Mobile network 115 may include one or more sub-networks, such as RAN 130 and a mobile core network 135 (referred to herein as "core network 135" or "mobile core network 135"). Mobile network 115 may include one or more nodes/functions (e.g., UPF(s) 150) that interconnect with data network 120. Mobile network 115 may, as described with respect to FIG. 3 below, implement multiple different network slices for data sessions transiting across mobile network 115, such as from a UE 110 to an app server 123, or from an app server 123 to a UE 110.

RAN 130 may include various types of radio access equipment that implement Radio Frequency (RF) communication with UEs 110. The radio access equipment of RAN 130 may include, for example, multiple Distributed Units (DUs) and Radio Units (RUs), and at least one Control Unit-User Plane function (CU-UP) 145 and at least one Control Unit-Control Plane (CU-CP) function 148. Additionally, or alternatively, RAN 130 may include non-split or integrated RAN devices, such as a Next Generation NodeB (gNB). Only a single one of CU-UP 145 and CU-CP 148 is shown in FIG. 1, however, RAN 130 may include multiple CU-CPs 148 and CU-UPs 145. Each DU includes a logical node that hosts functions associated with the Radio Link Control (RLC) layer, the Medium Access Control (MAC) layer, and the physical layer (PHY). A RU may be connected to each DU, and each RU may include at least one radio transceiver, and associated antenna(s), for RF wireless communication with one or more UEs 110 within radio range of the RU.

CU-UP 145 may interconnect with one or more DUs of RAN 130 via fronthaul links or a fronthaul network, and may include a logical node that hosts user plane functions, such as, for example, data routing and transport functions. CU-CP 148 includes a logical node that hosts Radio Resource Control (RRC), and other control plane, functions (e.g., Service Data Adaptation Protocol (SDAP), Packet Data Convergence Protocol (PDCP)) for the CU-UP 145. RAN 130 may additionally include other nodes, functions, and/or components not shown in FIG. 1.

Core network 135 includes devices or nodes that implement network functions (e.g., VNFs) that operate the mobile network 115 including, among other network functions (NFs), mobile network access management, session management, and policy control NFs. In the example network environment 100 of FIG. 1, core network 135 is shown as including a 5G mobile network that further includes 5G NFs, such as a User Plane Function (UPF) 150, a Session Management Function (SMF) 155, an Access and Mobility Management Function (AMF) 160, a Network Repository Function (NRF) 165, a Policy Control Function (PCF) 170, a Unified Data Management (UDM) function 175, a Network Slice Selection Function (NSSF) 180, and a slice manager and orchestrator 185. UPF 150, SMF 155, AMF 160, NRF 165, PCF 170, UDM 175, NSSF 180, and slice manager and orchestrator 185 may, for example, be implemented as VNFs within mobile network 115.

UPF 150 may act as a router and a gateway between mobile network 115 and data network 120, and forwards session data between data network 120 and RAN 130. Though only a single UPF 150 is shown in FIG. 1, mobile network 115 may include multiple UPFs 150 at various locations in mobile network 115. SMF 155 performs session management, allocates network addresses to UEs 110, and selects and controls UPFs 150 for data transfer. AMF 160 performs, among other functions described herein, authentication, authorization, and mobility management for UEs 110.

NRF 165 operates as a centralized repository of information regarding NFs in mobile network 115. NRF 165 enables NFs (e.g., UPF 150, SMF 155, AMF 160, PCF 170, UDM 175, NSSF 180) to register and discover each other via an Application Programming interface (API). NRF 165 maintains an updated repository of information about the NFs available in mobile network 115, along with information about the services provided by each of the NFs. NRF 165 further enables the NFs to obtain updated status information of other NFs in mobile network 115. NRF 165 may, for example, maintain profiles of available NF instances and their supported services, allow NF instances to discover other NF instances in mobile network 115, and allow NF instances to track the status of other NF instances.

PCF 170 implements policy and charging control for data flows and session related policy control. UDM 175 manages data for user access authorization, user registration, and data network profiles. The UDM may operate in conjunction with a Unified Data Repository (UDR) (not shown) which stores user data, such as customer profile information, customer authentication information, and encryption keys. NSSF 180 selects a set of network slice instances (NSIs) that may serve a UE 110, and determines the allowed single Network Slice Selection Assistance Information (S-NSSAI) for a UE 110 or a FWA GW 105. Slice manager and orchestrator 185 performs, among other operations and functions, network slice and NSI creation, virtual network resource allocation, instantiation, and provisioning, and network slice and NSI monitoring, reporting, and life cycle management (LCM).

Data network 120 may include one or more interconnected networks, such as local area networks (LANs), wide area networks (WANs), metropolitan area networks (MANs), Multi-Access Edge Computing networks (MECs), and/or the Internet. Data network 120 may, for example, connect with UPFs 150 of mobile network 115.

Apps (not shown in FIG. 1) at UEs 110 may connect to app servers 123-1 through **130-*m* in data network 115 and the app servers 123 may communicate with UEs 110 via data network 120, UPF 150, and one or more CU-UPs 145 of mobile network 115**.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 135 may include other NFs not shown in FIG. 1. As a further example, though mobile network 115 is depicted in FIG. 1 as a 5G network having 5G network components/functions, mobile network 115 may additionally or alternatively include a Fourth Generation (4G) or 4.5G network with corresponding network components/functions, or a hybrid Next Generation/4G network that includes certain components of both a Next Generation network (e.g., a 5G network) and a 4G network. Mobile network 115 may alternatively include another type of Next Generation network, other than the 5G network shown in FIG. 1 (e.g., a Sixth Generation (6G) mobile network). Additionally, though only a single one of each of the NFs UPF 150, SMF 155, AMF 160, NRF 165, PCF 170, UDM 175, NSSF 180, and slice manager and orchestrator 185 is shown in FIG. 1, mobile network 110 may include multiple instances of each of these NFs. For example, when mobile network 115 implements network slicing, each of the configured network slices may include its own SMF 155, PCF 170, and UPF 150. Each of the NFs described above may be installed in, and be executed by, a network device residing in mobile network 115, or in another network (e.g., in an edge or a far edge network, not shown). A single network device may host and execute one or more of the NFs described above, and mobile network 115 may include at least one network device, or may have multiple (e.g., numerous) network devices.

Figure 2:
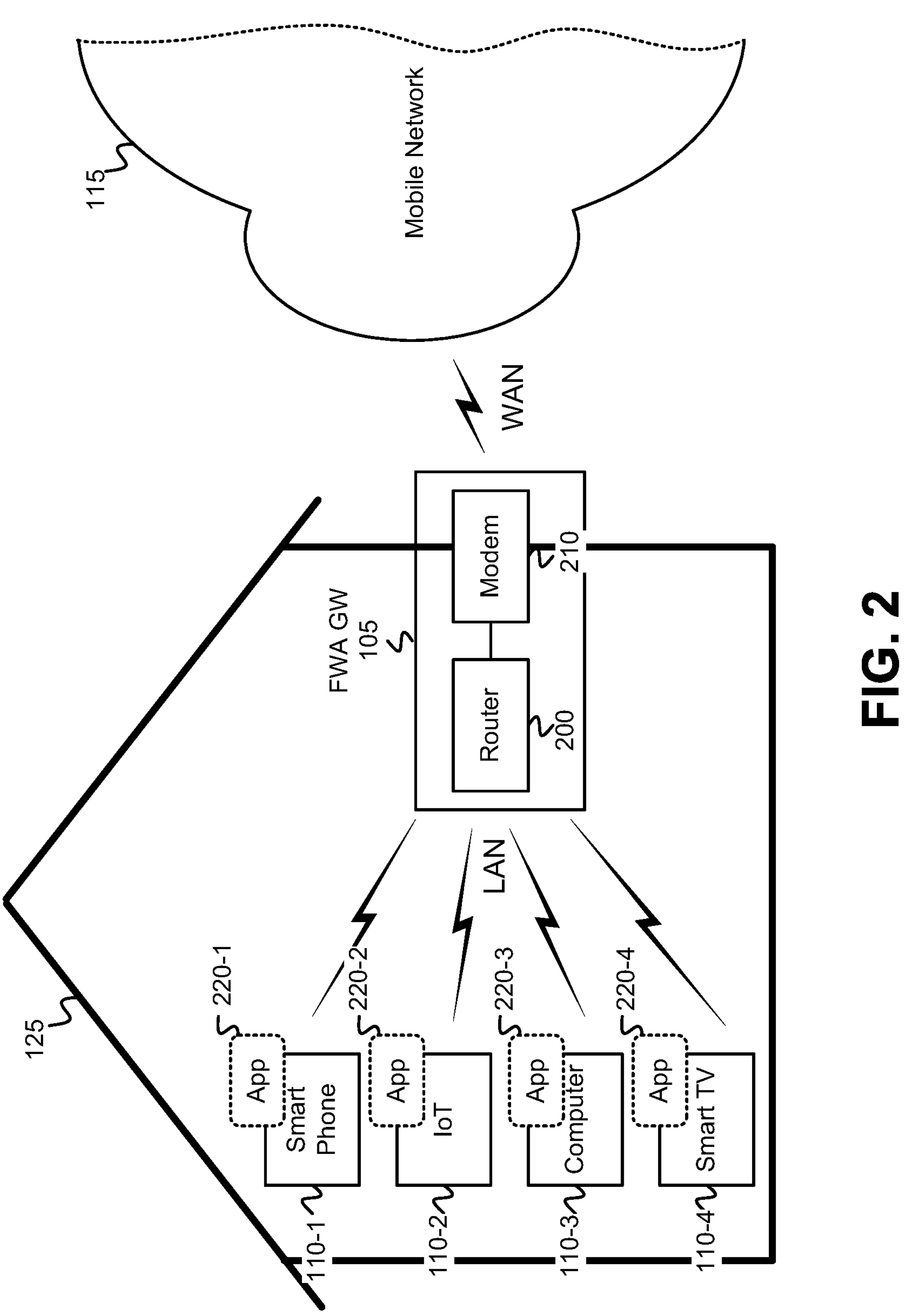
FIG. 2 illustrates the use of a FWA GW at a particular residential or business location.

FIG. 2 illustrates the use of a FWA GW 105 at a particular residential/business location 125. As shown, different types of UEs 110 may reside at location 125, including a smart phone 110-1, an IoT device 110-2, a computer 110-3, and a smart television (TV) 110-4. Each of the UEs 110 connect to FWA GW 105, also located at residential/business location 125, on a LAN side of GW 105. FWA GW 105 further connects to mobile network 115 on a WAN side of GW 105 using wireless (e.g., RF) signaling and mobile network communication protocols. Each UE 110 may execute at least one application (app) that engages in traffic sessions across the LAN, FWA GW 105, the WAN, and mobile network 115. For example, FIG. 2 shows an app 220-1 executing at smart phone 110-1, an app 220-2 executing at IoT device 110-2, an app 220-3 executing at computer 110-3, and an app 220-4 executing at smart TV 110-4.

FWA GW 105 includes, among other components not shown, a router 200 and a modem 210. FWA GW 105, among other functions, receives and stores URSP information distributed from mobile network 115, and stores the URSP information for potentially supported network slices for the mobile network 115. Router 200, for outgoing (upstream) traffic from the UEs 110-1 through 110-4, identifies a network slice for each session and routes the session traffic via the identified network slice. Router 200 forwards the outgoing session traffic for each of the UEs 110-1 through 110-4 to modem 210 for wireless transmission to mobile network 115.

Further, router 200 receives, from modem 210, incoming (downstream) traffic, via a particular network slice, that is destined for one or more of the UEs 110-1 through 110-4. A data unit(s) (e.g., a protocol data unit (PDU)) for the incoming traffic may include data that includes a network slice identifier that identifies the network slice in mobile network 115 via which the data traffic traversed the mobile network 115. Router 200 forwards the incoming traffic to the destination UE(s) 110 identified by destination data via the LAN between FWA GW 105 and the destination UE(s).

Figure 3:
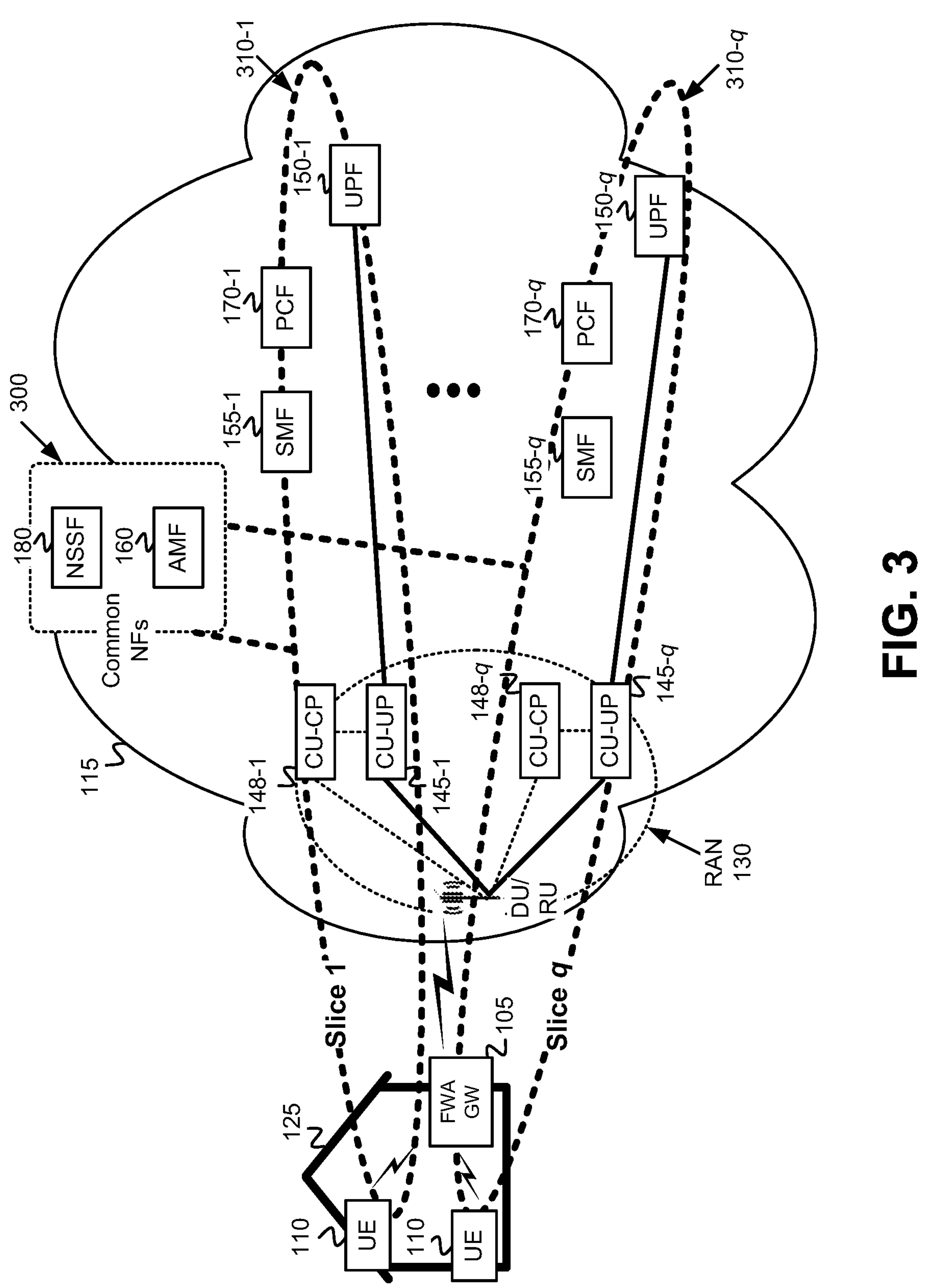
FIG. 3 depicts an example of the division of a mobile network into multiple end-to-end network slices.

FIG. 3 depicts an example of the division of the mobile network 115 into multiple (q) end-to-end network slices. Each network slice of network slices 310-1 through **310-*q*** may include a logical end-to-end network, which may run on a shared physical infrastructure, that is created to serve a particular purpose and/or service data traffic with a particular set of performance parameters or characteristics. For example, each network slice of network slices 310-1 through **310-*q*** may service a particular service type and/or may satisfy or meet particular performance characteristics or parameters for sessions served by the network slice. In some implementations, each network slice may have a different Slice/Service Type (SST), such as, for example, an enhanced Mobile Broadband (eMBB) SST, an Ultra Reliable Low Latency Communications (URLLC) SST, or a Massive Internet of Things (MIOT) SST. Each network slice may, however, have a different SST not described herein.

As shown in FIG. 3, a group of common NFs 300 of mobile network 115 may service the different network slices 310-1 through **310-*q* (where, in this example, q is greater than or equal to two) and, therefore, may not be considered to be included within the network slices 310-1 through 310-*q*. In the example shown, the common NFs 300 of mobile network 110 include an AMF 160 and a NSSF 180**.

Each network slice may include its own dedicated set of NFs, where each NF operates to service UE sessions handled by that particular network slice. For example, as shown in FIG. 3, network slice 310-1 includes SMF 155-1, PCF 170-1, UPF 150-1, CU-UP 145-1, and CU-CP 148-1 that may operate to exclusively service traffic of UE sessions within network slice 310-1. As a further example, network slice **310-*q* includes SMF 155-*q*, PCF 170-*q*, UPF 150-*q*, CU-UP 145-*q*, and CU-CP 148-*q* that may operate to exclusively service traffic of UE sessions within network slice 310-*q***.

Each network slice 310 may be served by one or more NSIs. An NSI, as referred to herein, includes a set of NF instances and the resources (e.g., compute, storage, and networking resources) required to form a deployed NSI for serving a particular network slice. Thus, each network slice 310 may include one or more NSIs, with each NSI serving the overall purpose and/or performance requirements of the network slice 310 within the constraints of the network slice 310, and each NSI may be assigned its own NSI identifier (ID). Each network slice 310 may be assigned a Single-Network Slice Selection Assistance Information (S-NSSAI) value that uniquely identifies the network slice. The S-NSSAI value may, for example, include a Slice/Service Type (SST) value and a Slice Differentiator (SD) value (e.g., S-NSSAI=SST+SD). The SST may define the expected behavior of the network slice in terms of specific features and services. The SD value may be directly related to the SST value and may be used as an additional differentiator (e.g., if multiple network slices carry the same SST value). The S-NSSAI and NSI IDs, of the different NSIs within the network slice, may be used within mobile network 115 for network slice and NSI selection for servicing UE sessions.

As illustrated in FIG. 3, each of the network slices 310-1 through **310-*q* may extend through FWA GW 105 out to the UEs 110 based on the distribution of URSP information (not shown) from FWA GW 105 to the UEs 110 connected to FWA GW 105. As described further herein, each FWA GW 105 may receive URSP information that originates with a PCF 170, and may extract UE policy rules from the URSP information. Each FWA GW 105 may then determine device and/or application specific policy rules for each connected UE 110 based on the extracted URSP UE policy rules, and may distribute (e.g., via signaling over the LAN) the determined policy rules to connected UEs 110 such that the UEs 110 may use the policy rules for routing outgoing UE traffic over a particular network slice of network slices 310-1 through 310-*q*. Distribution of the policy rules from FWA GW 105 to connected UEs 110, thus, extends the network slicing through the FWA GW 105 and out to the UEs 110**.

Figure 4:
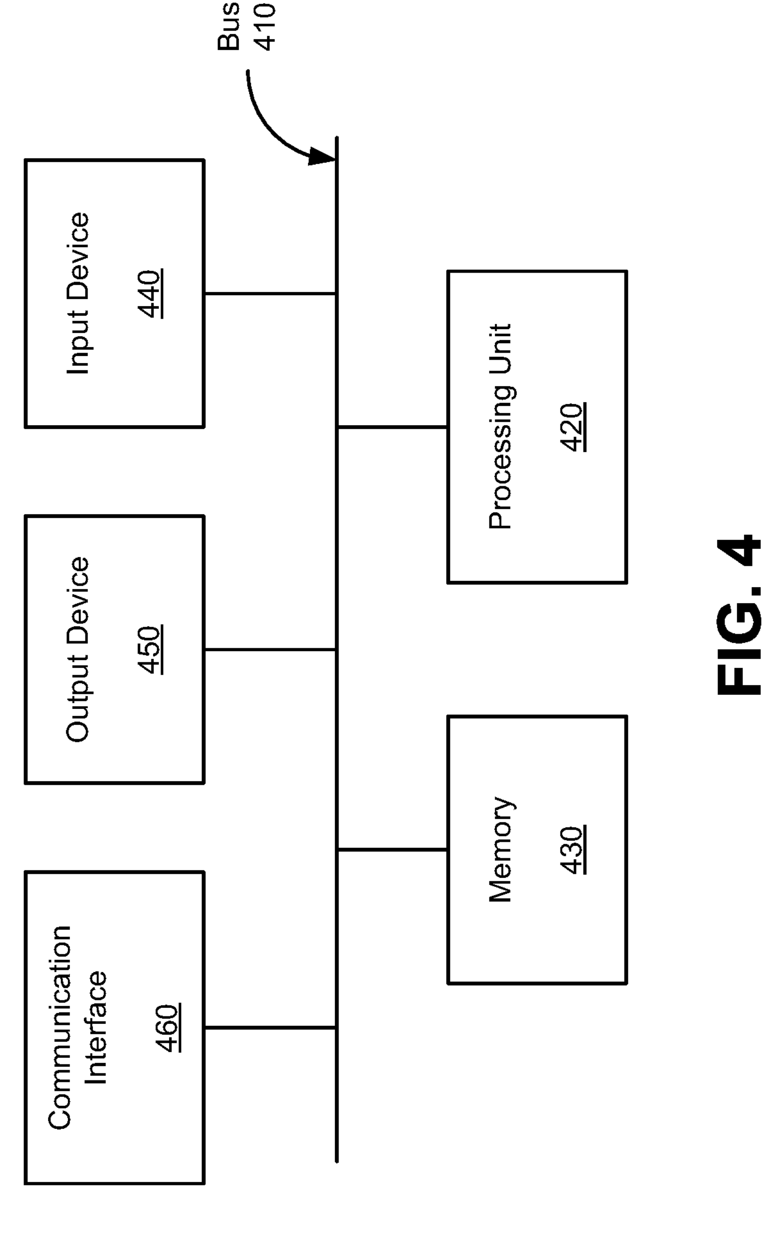
FIG. 4 is a diagram that depicts example components of a device described herein.

FIG. 4 is a diagram that depicts example components of a network device 400 (referred to herein as a "network device" or a "device"). As shown, device 400 may include a bus 410, a processing unit 420, a memory 430, an input device 440, an output device 450, and a communication interface 460. UEs 110, the DUs and RUs of RAN 130, and slice manager and orchestrator 185 may include components that are the same as, or similar to, those of device 400 shown in FIG. 4. Furthermore, each of the network functions UPF 150, SMF 155, AMF 160, NRF 165, PCF 170, UDM 175, and NSSF 180 may be implemented by a device that includes components that are the same as, or similar to, those of network device 400. Some of the NFs UPF 150, SMF 155, AMF 160, NRF 165, PCF 170, UDM 175, and NSSF 180 may be implemented by a same device 400 within mobile network 115, while others of the functions may be implemented by one or more separate devices 400 within mobile network 115. Additionally, FWA GW 105 may include, in addition to router 200 and modem 210, components that are the same as, or similar to, those of device 400 shown in FIG. 4 and which may be configured the same as, or similarly, to the components shown in FIG. 4. In one implementation, modem 210 may be one communication interface of communication interface(s) 460, and/or router 200 may be implemented by processing unit 420. In another implementation, router 200 and modem 210 may be separate components that may connect to the bus 410 of device 400, in addition to one or more of processing unit 420, memory 430, input device 440, output device 450, or communication interface 460 that may also connect to the bus 410.

Bus 410 may include a path that permits communication among the components of device 400. Processing unit 420 may include one or more processors or microprocessors which may interpret and execute instructions, or processing logic. Memory 430 may include one or more memory devices for storing data and instructions. Memory 430 may include a random access memory (RAM) or another type of dynamic storage device that may store information and instructions for execution by processing unit 420, a Read Only Memory (ROM) device or another type of static storage device that may store static information and instructions for use by processing unit 420, and/or a magnetic, optical, or flash memory recording and storage medium. The memory devices of memory 430 may each be referred to herein as a "tangible non-transitory computer-readable medium," "non-transitory computer-readable medium," or "non-transitory storage medium." In some implementations, the processes/methods (or portions of the processes/methods) set forth herein can be implemented as instructions that are stored in memory 430 for execution by processing unit 420.

Input device 440 may include one or more mechanisms that permit an operator to input information into device 400, such as, for example, a keypad or a keyboard, a display with a touch sensitive panel, voice recognition and/or biometric mechanisms, etc. Output device 450 may include one or more mechanisms that output information to the operator, including a display, a speaker, etc. Input device 440 and output device 450 may, in some implementations, be implemented as a user interface (UI) that displays UI information and which receives user input via the UI. Communication interface 460 may include a transceiver(s) that enables device 400 to communicate with other devices and/or systems. For example, communication interface 460 may include one or more wired and/or wireless transceivers for communicating via mobile network 115 and/or data network 120. In the case of RUs of RAN 130, communication interface 460 may further include one or more antenna arrays for producing radio frequency (RF) cells or cell sectors.

The configuration of components of network device 400 illustrated in FIG. 4 is for illustrative purposes. Other configurations may be implemented. Therefore, network device 400 may include additional, fewer and/or different components, that may be arranged in a different configuration, than depicted in FIG. 4.

Figure 5A:
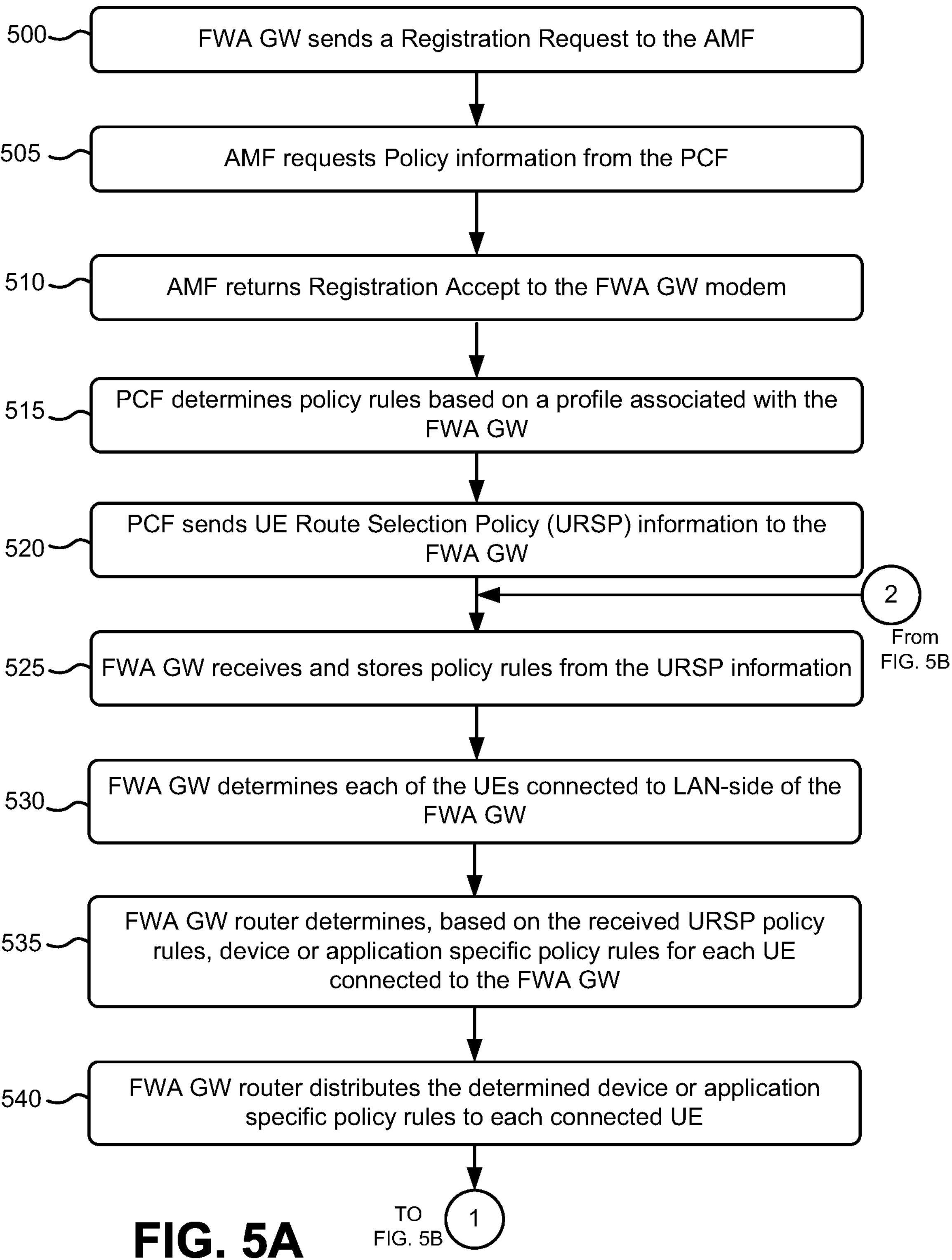
FIGS. 5A and 5B are flow diagrams of an example process for distributing UE policy rules from a FWA GW to UEs connected behind the FWA GW to enable the UEs to apply the policy rules to route traffic via policy rule-directed network slices.
Figure 5B:
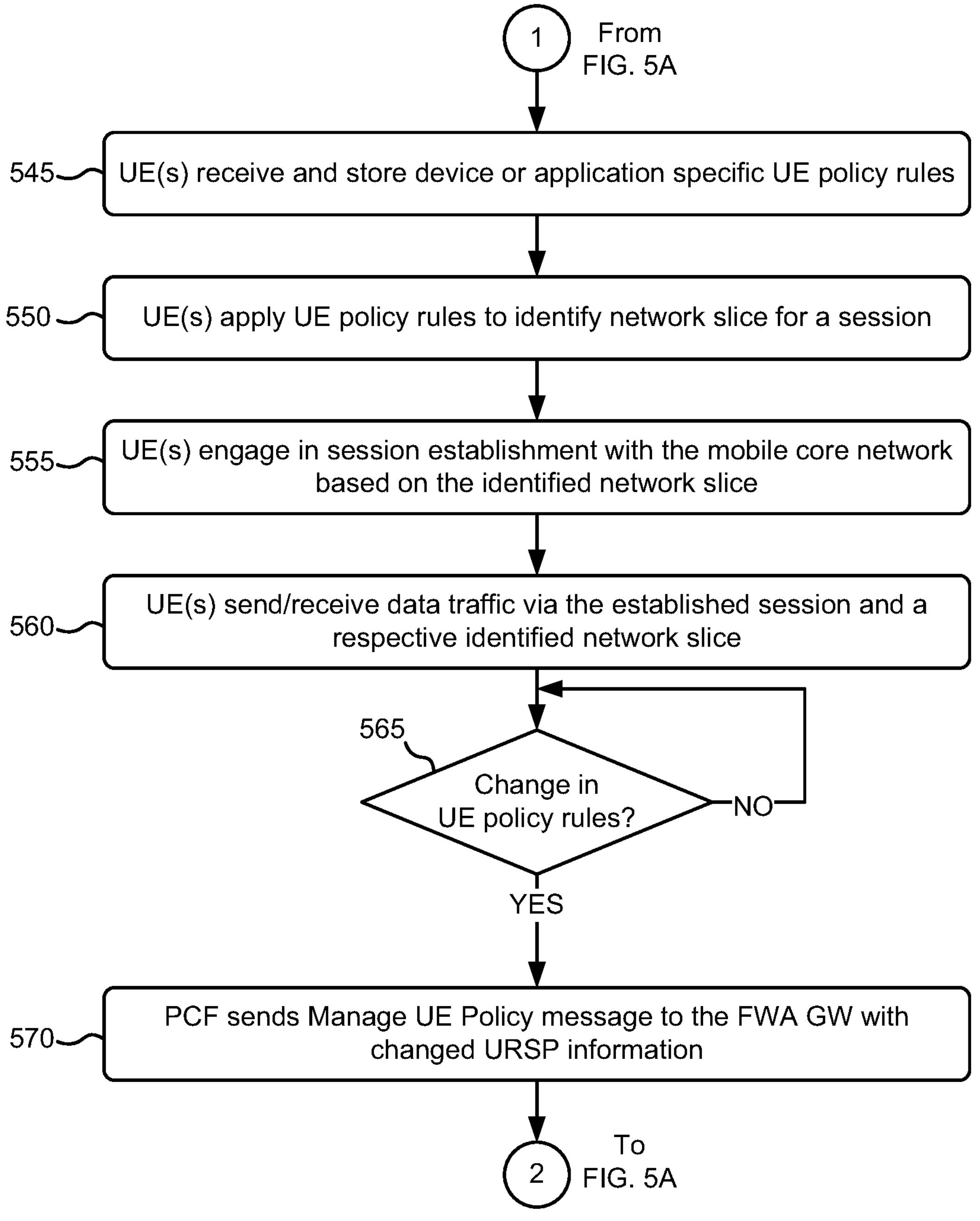

FIGS. 5A and 5B are flow diagrams of an example process for distributing UE policy rules from a FWA GW to UEs connected behind the FWA GW to enable the UEs to apply the policy rules to route traffic via policy rule-directed network slices. The example process of FIGS. 5A and 5B may be implemented by various devices, nodes, and/or functions within the network environment 100 of FIG. 1, such as, for example, a FWA GW 105, an AMF 160, a PCF 170, and a UE 110 (*s*). The example process of FIGS. 5A and 5B is described with additional reference to FIGS. 6A-6C.

Figure 6A:
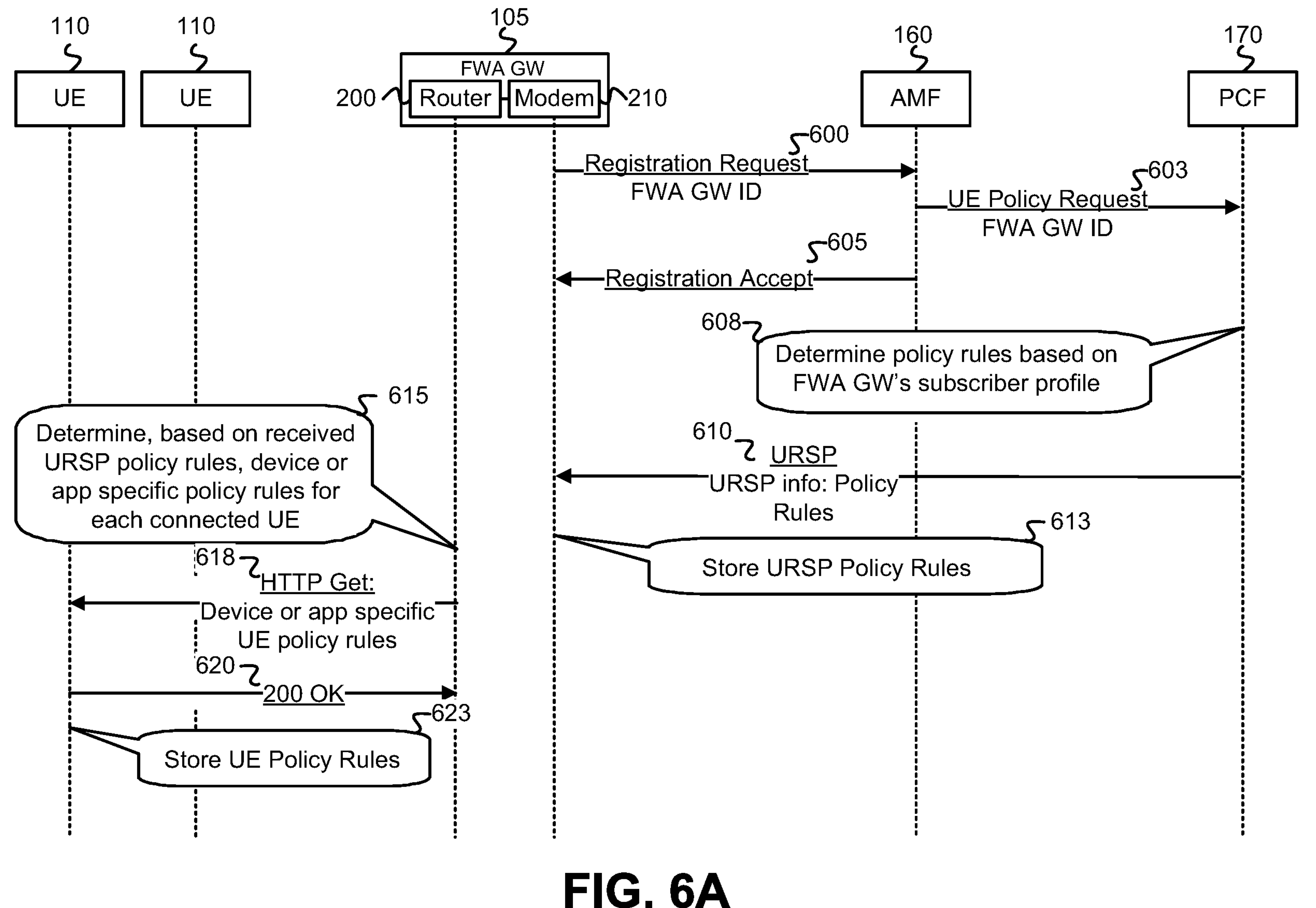
FIGS. 6A, 6B, and 6C depict sequences of operations, messages, and/or data flows associated with an example process.

The exemplary process includes modem 210 of FWA GW 105 sending a Registration Request to the AMF 160 (block 500). AMF 160, in response to receipt of the Registration Request from the FWA GW 105, requests UE policy information from the PCF 170 (block 505), and returns a Registration Accept message to the FWA GW 105 (block 510). For example, when FWA GW 105 powers up from a powered down state, then modem 210 of FWA GW 105 sends a Registration Request that identifies the FWA GW 105. The Registration Request initiates a process of interaction between FWA GW 105, AMF 160, PCF 170, and UEs 110, described further below, to retrieve policy rules for the FWA GW 105, send the policy rules to the FWA GW 105, and then distribute the policy rules from FWA GW 105 to UEs 110 connected on a LAN side of FWA GW 105, for application to traffic at the UEs 110, including selecting a network slice(s) for outgoing traffic at the UEs 110. As shown in FIG. 6A, FWA GW 105 sends to AMF 160 a Registration Request 600 that includes a FWA GW ID, and AMF 160, in response to receipt of the Registration Request 600 from FWA GW 105, sends to PCF 170 a UE Policy Request 603 that includes the FWA ID associated with FWA GW 105. FIG. 6A further shows AMF 160 returning a Registration Accept message 605 to FWA GW 105.

Upon receipt of the policy request from AMF 160, PCF 170 determines policy rules based on a profile associated with the FWA GW 105 (block 515) and sends UE Route Selection Policy (URSP) information to FWA GW 105 (block 520). PCF 170, when the UE Policy Request is received from AMF 160 for FWA GW 105, accesses a profile associated with the FWA GW 105 (e.g., stored in memory locally at the PCF 170, or stored in a PCF-accessible memory that is remotely located relative to PCF 170), and determines a set of policy rules to be applied to the UE traffic at the FWA GW 105 based on the profile. For example, FWA GW 105 may be associated with a network subscription that includes a particular set of network slices that are part of the subscription, and each FWA GW 105's profile may include a different set of policy rules that are generated based on the particular set of network slices that are part of the FWA GW 105's network subscription. The set of policy rules may include multiple UE policy rules, with each having, for example, its own UE Policy Section Code (UPSC) and an associated policy rule(s). The determined set of policy rules may, therefore, include the following: {UPSC_1, UE_Policy_Rule_1; UPSC_2, UE_Policy_Rule_2; UPSC_n, UE_Policy_Rule_n}. The URSP information returned by the PCF 170 to the UE 105 may include, among other information, the UPSCs and associated UE policy rules determined by the PCF 170 based on the FWA GW 105's subscriber profile. FIG. 6A shows PCF 170 determining 608 policy rules based on the FWA GW 105's subscriber profile, and sending a URSP message 610 to FWA GW 105, where the URSP information in message 610 includes the determined policy rules for FWA GW 105.

FWA GW 105 receives and stores policy rules from the URSP information (block 525) and determines each of the UEs 110 connected to the LAN-side of the FWA GW 105 (block 530). Upon modem 210 receiving the message that contains the URSP information, FWA GW 105 extracts a set of policy rules (e.g., the UPSCs and their associated UE policy rules), and stores the set of policy rules locally at the FWA GW 105. As part of determining each of the UEs 110 connected to the LAN-side of FWA GW 105, FWA GW 105 may determine a specific type of each of the UEs 110 that are connected to a LAN-side of the FWA GW 105, and/or determine one or more applications (apps) that are installed at each of the UEs 110 connected to the LAN-side of the FWA GW 105. The specific type of each of the UEs 110 may include, for example, a wearable device, a smartphone, a tablet, an Internet of Things (IoT) or Machine-to-Machine (M2M) device, a smart speaker, a video gaming device, a music player, a digital camera, or a wireless telematics device. Other types of UEs 110 may also, or alternatively, be determined by FWA GW 105. The FWA GW 105 may classify each connected UE 110 to a specific type of UE based on, for example, subscriber information obtained by the FWA GW 105 for each UE 110, or based on device data or metadata stored at each UE 110 or stored in mobile network 115. FWA GW 105 may additionally determine one or more apps that are installed at each of the UEs 110 connected to the FWA GW 105 based on, for example, subscriber information obtained by the FWA GW 105 for each UE 110, based on app data stored at each UE 110 or stored in mobile network 115, or based on previous data traffic (i.e., traffic originating from one or more identified apps) sent from each UE 110. FIG. 6A shows modem 210 of FWA GW 105 receiving the URSP information 610, and then storing 613 the URSP policy rules extracted from the information 610.

FWA GW 105 determines, based on the received URSP policy rules, device or application specific policy rules for each UE connected to the FWA GW 105 (block 535), and distributes the determined device or app specific policy rules to each connected UE 110 (block 540). FWA GW 105 may generate a subset of policy rules for each connected UE 110 using the full set of URSP policy rules received from PCF 170 in block 525. FWA GW 105 may generate the subset of policy rules for each UE 110 based, for example, on the specific type of UE 110, and/or the one or more apps residing at each UE 110, determined in block 530. In one example, if a UE 110, determined to be connected to the LAN-side of FWA GW 105 is also determined to be a smart phone device, then FWA GW 105 may extract any policy rules that are conditional on the UE 110 being a "smart phone," and then generates the subset of policy rules using the extracted policy rules. As a further example, if a UE 110, determined to be connected to the LAN-side of FWA GW 105 is also determined to have particular apps App_1 and App_2 residing at the UE 110, then FWA GW 105 may extract any policy rules that are conditional on the UE 110 using App_1 or App_2 for outgoing traffic, and generates the subset of policy rules using the extracted policy rules. The subset of policy rules for a particular UE 110 may, therefore, contain rules that are conditional on the specific type of the UE 110, or based on one or more apps residing at the UE 110. FWA GW 105 may obtain the full set of URSP policy rules received from PCF 170, and extract those policy rules that relate to the specific type of the UE 110, or to the particular app(s) residing at the UE 110, to generate the subset of policy rules to be distributed to the UE 110. FWA GW 105 may generate a subset of policy rules for each UE 110 connected to the LAN-side of FWA GW 105 and may then send the subset of policy rules to each UE 110 over the LAN using a respective data unit (e.g., packet). FIG. 6A depicts router 200 of FWA GW 105 determining 615, based on the URSP policy rules received in the URSP information 610, device or app specific policy rules for each UE 110 connected to the FWA GW 105 on the LAN-side of FWA GW 105.

Each UE(s) 110, to which FWA GW 105 distributed a subset of policy rules in block 540, receives and stores the device or application specific UE policy rules (block 545), and then applies the UE policy rules to identify a network slice(s) for a session involving outgoing data traffic (block 550). For example, each UE 110 may store the UE policy rules, distributed to the UE 110 in block 540, in memory 430 and may then apply the UE policy rules to route outgoing traffic via a selected network slice(s) of multiple network slices.

Figure 6B:
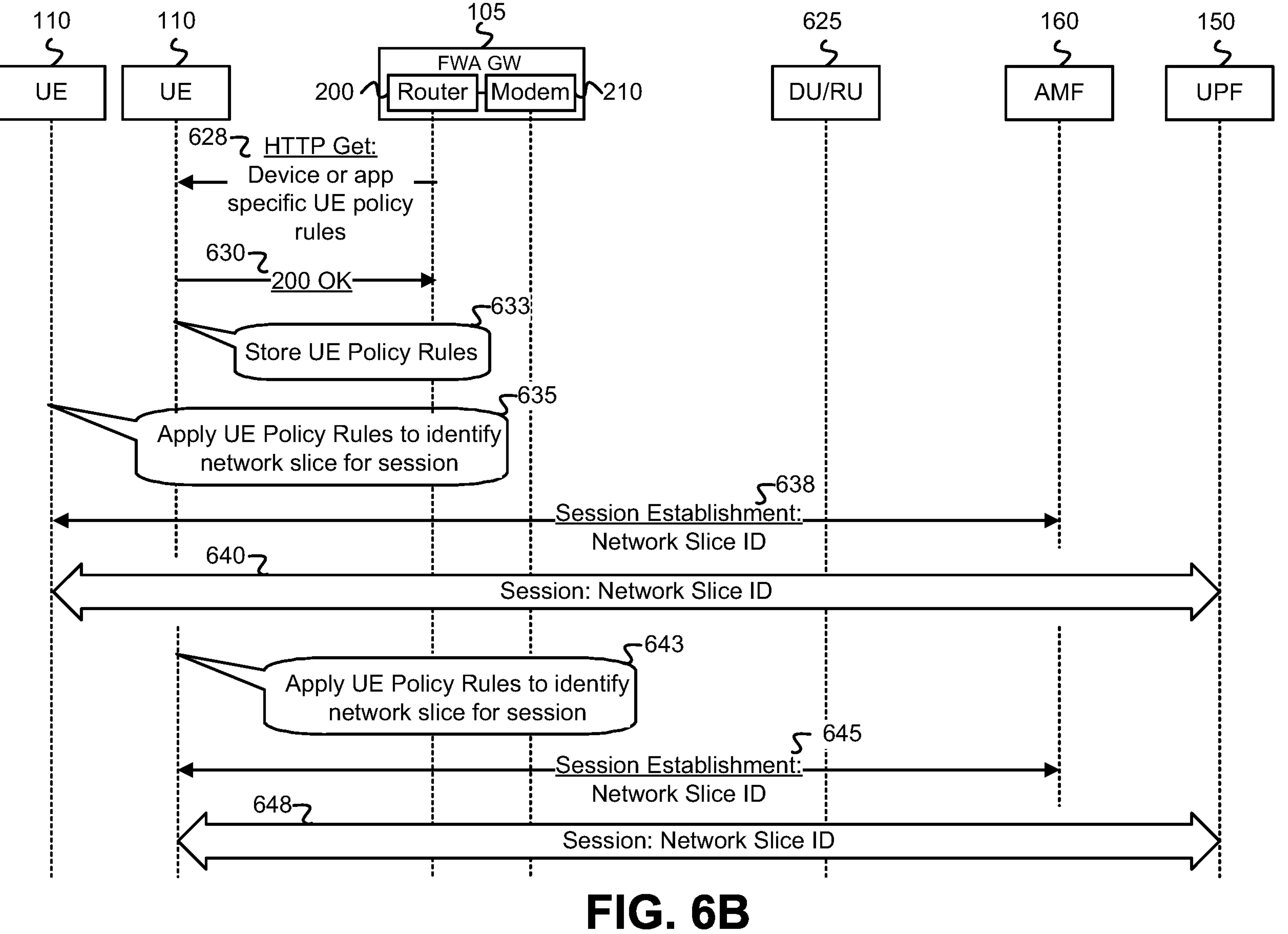

Each UE(s) 110 engages in session establishment with the mobile core network 135 based on the identified network slice (block 555), and then sends and/or receives data traffic via the established session and a respective network slice identified in block 550 (block 560). FIG. 6A shows an example of router 200 of FWA GW 105 sending a HyperText Transfer Protocol (HTTP) Get message 618 to a first UE 110 that includes the previously determined device or app specific UE policy rules, and, upon receipt of the message 618, UE 110 replying with an HTTP “200 OK” message 620 that acknowledges the receipt. FIG. 6A further shows the UE 110 storing 623 the device or app specific UE policy rules received from the FWA GW 105. FIG. 6B shows another example of router 200 of FWA GW 105 sending a HTTP Get message 628 to a second UE 110 that includes the previously determined device or app specific UE policy rules, and, upon receipt of the message 628, UE 110 replying with an HTTP “200 OK” message 630 that acknowledges the receipt. FIG. 6B further shows the second UE 110 storing 633 the device or app specific UE policy rules received from the FWA GW 105.

As additionally shown in FIG. 6B, the first UE 110 applies 635 the UE policy rules, distributed from FWA GW 105, to identify a network slice(s) for a session, and then engages in session establishment 638, via a DU/RU 625, with AMF 160 based on the identified network slice(s). The first UE 110 then sends/received data traffic via the established session 640 over the identified network slice(s). As also shown in FIG. 6B, the second UE 110 applies 643 the UE policy rules, distributed from FWA GW 105, to identify a network slice(s) for a session, and then engages in session establishment 645, via a DU/RU 625, with AMF 160 based on the identified network slice(s). The second UE 110 then sends/received data traffic via the established session 648 over the identified network slice(s).

PCF 170 subsequently determines whether a change in UE policy rules has occurred (block 565). If not (NO-block 565), then block 565 may repeat until a change in UE policy rules occurs. A change in one or more UE policy rules may occur based on, for example, a change occurring to one or more network slices that are configured and provisioned within mobile network 115, the addition or removal of network slices within mobile network 115, and/or a change in a subscription or subscriber profile associated with the registered FWA GW 105. If a change in UE policy rules has occurred (YES-block 565), then PCF 170 sends a “Manage UE Policy” message to the FWA GW 105 with changed URSP information that includes UE policy rule changes (block 570). The process may then return to block 525 (FIG. 5A) and blocks 525 through 560 may repeat based on the UE policy rule changes. For example, FWA GW 105 may receive and store the UE policy rules that contain changes (e.g., block 525), and then determine a new subset of device or application specific policy rules based on the set of received UE policy rules, that contain changes, for each UE 110 connected to the FWA GW 105 (e.g., block 535). FWA GW 105 may then re-distribute the determined device or application specific policy rules to each connected UE 110 (e.g., block 540). The connected UEs 110 may receive and store the device or application specific UE policy rules (e.g., block 545), apply the UE policy rules to identify a network slice(s) for a new, or existing, session (e.g., block 550), and engage in new session establishment, or existing session re-establishment, with the mobile core network 135 based on the identified network slice(s) (e.g., block 555). Each connected UE 110 may then send/receive data traffic via the newly established or re-established session and a respective identified network slice (e.g., block 560).

Figure 6C:
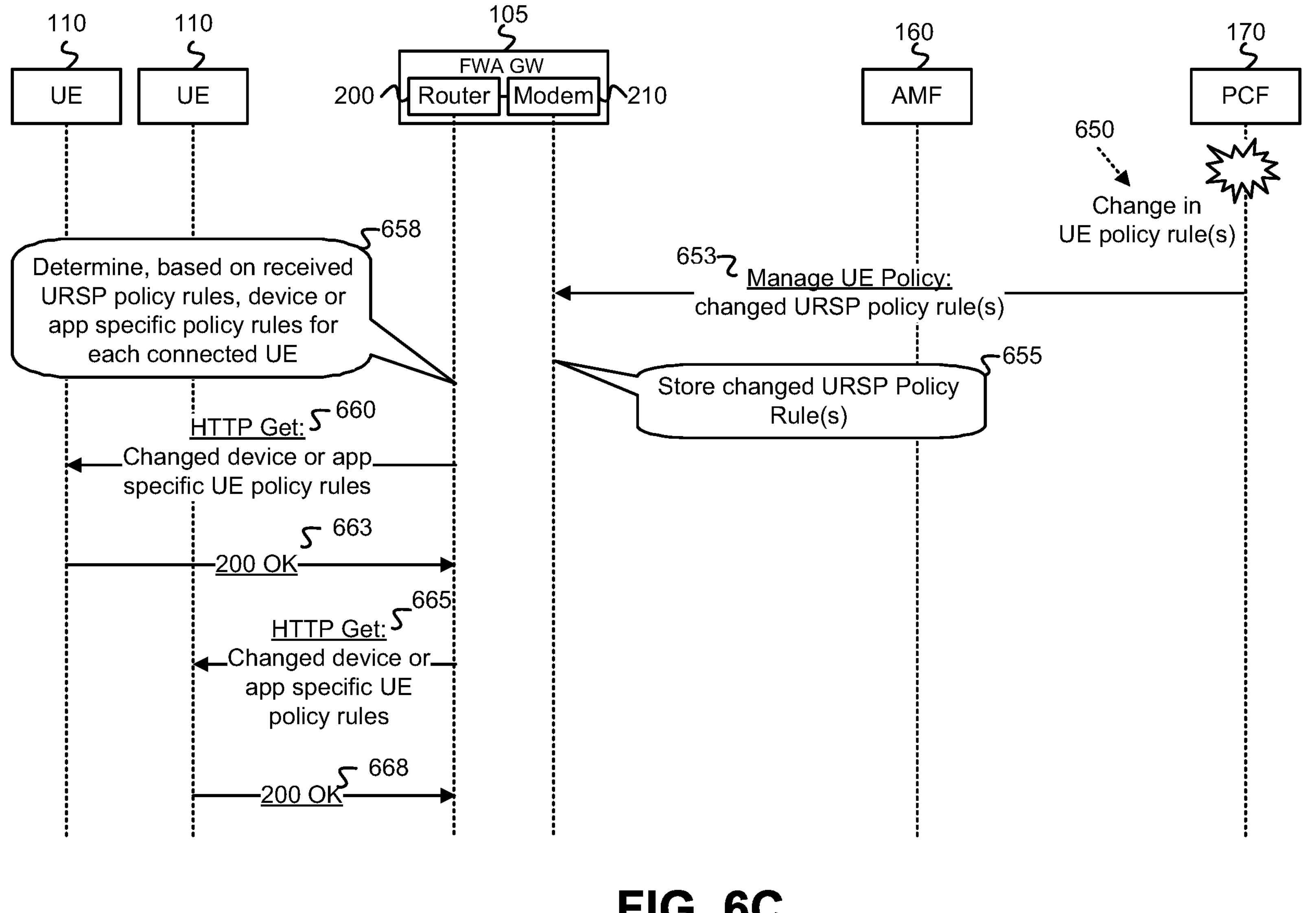

FIG. 6C depicts an example of a change 650 in UE policy rules occurring at the PCF 170 which stores and maintains policy rules for FWA GW 105. Upon occurrence of a change in any of the UE policy rules previously sent to FWA GW 105 (e.g., sent in block 520 of FIG. 5A), PCF 170, as shown, sends a “Manage UE Policy” message 653 to FWA GW 105 (via AMF 160). Upon receipt of the message 653, modem 210 of FWA GW 105 stores 655 the changed URSP policy rule(s), and router 200 of FWA GW 105 determines 658, based on the URSP policy rules received in the message 653, device or app specific policy rules for each UE 110 connected to the FWA GW 105 on the LAN-side of FWA GW 105. Router 200 of FWA GW 105 determines the device or app specific policy rules for each UE 110 connected to the FWA GW 105 as described above with respect to blocks 530 and 535 of FIG. 5A.

As further shown in the example of FIG. 6C, router 200 of FWA GW 105 sends HTTP Get message 660 to a first UE 110 that includes the changed device or app specific UE policy rules, and, upon receipt of the message 660, the first UE 110 replies with a HTTP “200 OK” message 663 that acknowledges the receipt. FIG. 6C shows router 200 of FWA GW 105 sending another HTTP Get message 665 to a second UE 110 that includes the changed device or app specific UE policy rules, and, upon receipt of the message 665, UE 110 replying with an HTTP “200 OK” message 668 that acknowledges the receipt. The first UE 110 and the second UE 110 subsequently both store (not shown in FIG. 6C) the changed device or app specific UE policy rules received from the FWA GW 105. Each of the UEs 110 replaces, in local memory, the previously stored policy rules with the changed device or app specific UE policy rules newly received from FWA GW 105. The changed device or app specific UE policy rules may subsequently be applied by the UEs 110 to route traffic via a policy rule-directed network slice of mobile network 115.

The blocks of FIGS. 5A and 5B may be repeated for each new Registration Request involving a FWA GW powering on within the wireless coverage area of mobile network 115. Alternatively, the blocks of FIGS. 5A and 5B may be repeated, in their entirety or in part, periodically, or based on the occurrence of an event involving FWA GW 105, even after FWA GW 105 has initially registered with the mobile network 110. The blocks of FIGS. 5A and 5B may be executed in parallel for each FWA GW 105 of numerous FWA GWs 105 connected to mobile network 115.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A and 5B, and sequences of operations, messages, and/or data flows with respect to FIGS. 6A-6C, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a Fixed Wireless Access (FWA) gateway (GW) wirelessly connected to a mobile network, user equipment device (UE) Route Selection Policy (URSP) information that includes a set of UE policy rules;

classifying, by the FWA GW, a first UE connected to the FWA GW to a first device type among multiple device types;

identifying, by the FWA GW, a first subset, of the set of UE policy rules, that contain rules that are conditional on the classified first device type of the first UE;

extracting, by the FWA GW from the set of UE policy rules, the identified first subset of UE policy rules and generating first UE-specific policy rules; and distributing, by the FWA GW, the generated first UE-specific policy rules to the connected first UE for policy application at the first UE.

2. The method of claim 1, wherein the set of UE policy rules comprise policy rules that route UE traffic among multiple network slices in the mobile network.

3. The method of claim 1, wherein the URSP information received by the FWA GW originates at a Policy Control Function (PCF) in the mobile network.

4. The method of claim 1, further comprising:

receiving, by the FWA GW, updated URSP information that includes a second set of UE policy rules;

identifying, by the FWA GW, a second subset, of the second set of UE policy rules, that contain rules that are conditional on the classified first device type of the first UE;

extracting, by the FWA GW from the second set of UE policy rules, the identified second subset of UE policy rules and generating second UE-specific policy rules; and distributing, by the FWA GW, the generated second UE-specific policy rules to the connected first UE for policy application at the first UE.

5. The method of claim 1, further comprising:

determining a first application that is installed at the first UE;

identifying, by the FWA GW, a second subset, of the set of UE policy rules, that contain rules that are conditional on the first UE's use of the determined first application;

extracting, by the FWA GW from the set of UE policy rules, the identified second subset of UE policy rules and generating the second UE-specific policy rules; and distributing, by the FWA GW, the generated second UE-specific policy rules to the connected first UE for policy application at the first UE.

6. The method of claim 1, further comprising:

classifying, by the FWA GW, a second UE connected to the FWA GW to a second device type;

identifying, by the FWA GW, a second subset, of the set of UE policy rules, that contain rules that are conditional on the classified second device type of the second UE;

extracting, by the FWA GW from the set of UE policy rules, the identified second subset of UE policy rules and generating second UE-specific policy rules; and distributing, by the FWA GW, the generated second UE-specific policy rules to the connected second UE for policy application at the second UE.

7. The method of claim 1, wherein classifying the first UE to the first device type further comprises:

classifying the first device type as one of the multiple device types comprising a wearable device, a smartphone, a tablet, a smart speaker, a video gaming device, a music player, or a digital camera.

8. The method of claim 1, wherein classifying the first UE to the first device type further comprises:

using at least one of subscriber information obtained by the FWA GW, or device data or metadata stored at the first UE or stored in the mobile network, to determine the first device type.

9. A Fixed Wireless Access (FWA) gateway (GW), comprising:

a modem wirelessly connected to a mobile network and configured to receive user equipment device (UE) Route Selection Policy (URSP) information that includes a set of UE policy rules;

a communication interface connected to a Local Area Network (LAN); and a router connected to the communication interface and configured to:

classify a first UE connected to the LAN to a first device type among multiple device types, identify a first subset, of the set of UE policy rules, that contain rules that are conditional on the classified first device type of the first UE, extract, from the set of UE policy rules, the identified first subset of UE policy rules and generate first UE-specific policy rules, and distribute, via the communication interface, the generated first UE-specific policy rules to the connected first UE for policy application at the first UE.

10. The FWA GW of claim 9, wherein the set of UE policy rules comprise policy rules that route UE traffic among multiple network slices in the mobile network.

11. The FWA GW of claim 9, wherein the modem is further configured to receive updated URSP information that includes a second set of UE policy rules, and wherein the router is further configured to:

identify a second subset, of the second set of UE policy rules, that contain rules that are conditional on the classified first device type of the first UE, extract, from the second set of UE policy rules, the identified second subset of UE policy rules and generate second UE-specific policy rules, and distribute the generated second UE-specific policy rules to the connected first UE for policy application at the first UE.

12. The FWA GW of claim 9, wherein the router is further configured to:

determine a first application that is installed at the first UE, identify a second subset, of the set of UE policy rules, that contain rules that are conditional on the first UE's use of the determined first application, extract, from the set of UE policy rules, the identified second subset of UE policy rules and generate the second UE-specific policy rules, and distribute the generated second UE-specific policy rules to the connected first UE for policy application at the first UE.

13. The FWA GW of claim 9, wherein the router is further configured to:

classify a second UE connected to the FWA GW to a second device type, identify a second subset, of the set of UE policy rules, that contain rules that are conditional on the classified second device type of the second UE, extract, from the set of UE policy rules, the identified second subset of UE policy rules and generate second UE-specific policy rules, and distribute, via the communication interface, the generated second UE-specific policy rules to the connected second UE for policy application at the second UE.

14. The FWA GW of claim 9, wherein, when classifying the first UE to the first device type, the router is further configured to:

classify the first device type as one of the multiple device types comprising a wearable device, a smartphone, a tablet, a smart speaker, a video gaming device, a music player, or a digital camera.

15. The FWA GW of claim 9, wherein, when classifying the first UE to the first device type, the router is further configured to:

use at least one of subscriber information obtained by the FWA GW, or device data or metadata stored at the first UE or stored in the mobile network, to determine the first device type.

16. A non-transitory storage medium storing instructions executable by a Fixed Wireless Access (FWA) Gateway (GW) wirelessly connected to a mobile network, wherein execution of the instructions causes the FWA GW to:

receive user equipment device (UE) Route Selection Policy (URSP) information that includes a set of UE policy rules;

classify a first UE connected to the FWA GW to a first device type among multiple device types;

identify a first subset, of the set of UE policy rules, that contain rules that are conditional on the classified first device type of the first UE;

extract, from the set of UE policy rules, the identified first subset of UE policy rules and generate first UE-specific policy rules; and distribute the generated first UE-specific policy rules to the connected first UE for policy application at the first UE.

17. The non-transitory storage medium of claim 16, wherein the set of UE policy rules comprise policy rules that route UE traffic among multiple network slices in the mobile network.

18. The non-transitory storage medium of claim 16, wherein execution of the instructions further causes the FWA GW to:

receive updated URSP information that includes a second set of UE policy rules;

identify, a second subset, of the second set of UE policy rules, that contain rules that are conditional on the classified first device type of the first UE;

extract, from the second set of UE policy rules, the identified second subset of UE policy rules and generate second UE-specific policy rules; and distribute the generated second UE-specific policy rules to the connected first UE for policy application at the first UE.

19. The non-transitory storage medium of claim 16, wherein execution of the instructions further causes the FWA GW to:

determine a first application that is installed at the first UE;

identify a second subset, of the set of UE policy rules, that contain rules that are conditional on the first UE's use of the determined first application;

extract, from the set of UE policy rules, the identified second subset of UE policy rules and generate the second UE-specific policy rules; and distribute the generated second UE-specific policy rules to the connected first UE for policy application at the first UE.

20. The non-transitory storage medium of claim 16, wherein execution of the instructions to cause the FWA GW to classify the first UE to the first device type further causes the FWA GW to:

classify the first device type as one of the multiple device types comprising a wearable device, a smartphone, a tablet, a smart speaker, a video gaming device, a music player, or a digital camera.

* * * * *